United States Patent [19]
Maehara et al.

[11] Patent Number: 6,119,833
[45] Date of Patent: Sep. 19, 2000

[54] DRUM BRAKE DEVICE HAVING LEADING/ TRAILING MODE AND DUO SERVO MODE

[75] Inventors: Toshifumi Maehara; Hiroo Kobayashi; Haruo Tsuzuku; Seiya Odaka; Yukio Iwata, all of Tokyo, Japan

[73] Assignee: Akebono Brake Industry Co., Ltd., Tokyo, Japan

[21] Appl. No.: 09/301,463

[22] Filed: Apr. 29, 1999

[30] Foreign Application Priority Data

Apr. 30, 1998 [JP] Japan ................................ 10-120922

[51] Int. Cl.⁷ .................................................. F16D 51/00
[52] U.S. Cl. ........................................... 188/325; 188/362
[58] Field of Search ........................... 188/106 F, 106 A, 188/106 P, 325 V, 364, 363, 362, 361

[56] References Cited

U.S. PATENT DOCUMENTS

| | | | |
|---|---|---|---|
| 4,387,792 | 6/1983 | Imamura | 188/106 F |
| 4,768,631 | 9/1988 | Heibel | 188/106 A |
| 5,062,504 | 11/1991 | Yamamoto | 188/106 A |

FOREIGN PATENT DOCUMENTS

| | | | |
|---|---|---|---|
| 2536142 | 5/1984 | France | 188/106 F |
| 0113925 | 5/1987 | Japan | 188/106 F |
| 3-113133 | 5/1991 | Japan. | |

Primary Examiner—Robert J. Oberleitner
Assistant Examiner—Lan Nguyen
Attorney, Agent, or Firm—Morgan, Lewis & Bockius LLP

[57] ABSTRACT

Disclosed is a drum brake device in which during a service brake application, a pair of brake shoes operates in a leading/trailing mode, and during a parking brake application, a parking brake mechanism operates to cause the brake shoes to operate in the duo servo mode. A first lever, an equalizer and a second lever, which make up the parking brake mechanism, are all assembled onto one of the brake shoes. The second lever includes an input portion, a lever contact portion and an equalizer contact portion. The input portion receives a force from a parking lever. The lever contact portion applies a turning force to the first lever. The equalizer contact portion applies a turning force to the equalizer. The second lever, when it is turned, turns the first lever and then the equalizer.

2 Claims, 4 Drawing Sheets

DRUM BRAKE DEVICE HAVING LEADING/ TRAILING MODE AND DUO SERVO MODE

BACKGROUND OF THE INVENTION

1. Field of the Invention

The present invention relates to a drum brake device for use in braking vehicles. More particularly, the invention relates to a drum brake device which functions such that during a service brake application, it operates as a brake device of the leading/trailing type having a good ability of producing stable braking effect, and during a parking brake application, it operates as a brake device of the duo servo type having a good ability of producing high braking effect.

2. Description of the Related Art

Generally, the drum brake device may be categorized into brake devices of the leading/trailing type, the two-leading type and duo servo type.

In the drum brake of the leading/trailing type, a wheel cylinder for expanding brake shoes is disposed between a pair of opposed brake shoes, specifically at one ends of those opposed brake shoes. An anchor portion is disposed between the other ends of the brake shoes. One brake shoe is used as a leading shoe, while the other brake shoe is used as a trailing shoe.

In the drum brake of the two-leading brake type, a wheel cylinder is disposed between the opposed ends of a pair of brake shoes oppositely disposed. The brake shoes are both used as leading shoes. This type of drum brake device is further categorized into a brake device of the single-drive type (TP1W), and a brake device of the dual-drive type (TP2W).

In the drum brake device of the duo servo type, a wheel cylinder for expanding brake shoes is disposed between a pair of opposed brake shoes, specifically at one ends of those opposed brake shoes. The other ends of the opposed brake shoes are mutually coupled by a link mechanism for transmitting an anchor counter force from one brake shoe to the other brake shoe.

Of those types of drum brake devices, the leading/trailing type drum brake device is advantageous in that the braking effect is stable, and a parking brake may readily be assembled into the brake device, but is disadvantageous in that the braking effect is lower in magnitude than that of the drum brake devices of the two-leading and duo servo type. Of the two-leading type of the drum brake device, the single-drive type (TP1W) brake device produces high gain during forward braking. During reverse braking, the drum brake device functions as a two-leading type brake device, and the braking effect is likely to be lower than the braking effect produced when it operates during forward braking. The dual-drive type (TP2W) brake device produces high braking effect during both the forward and reverse braking, and hence produces high gain. However, two wheel cylinders are indispensably used. Use of the two wheel cylinders increases manufacturing cost of the brake device, and requires a complicated mechanism for the parking brake assembled thereinto.

In the drum brake device of the duo servo type, an anchor counter force is input from one brake shoe to the other brake shoe. In other words, this drum brake device has the servo function. The natural results are that it can produce considerably high braking effect in both the forward and reverse braking modes, size reduction of the brake device is easy, and assembling the parking brake into the brake device is easy.

A serious disadvantage of the brake device of the duo servo type is that the braking effect greatly varies with friction coefficient of the brake shoe lining and contact states of the rotary drum. viz., the braking characteristics are instable. This is due to the fact that the brake device is sensitive to variations of the lining friction coefficient and the contact states.

Thus, those types of drum brake devices have advantages and disadvantages. The usual choice usually given to the designer in this circumstance is to appropriately select the type of drum brake device from among those ones in accordance with the performances and use purposes of the vehicles to which the brake device is applied and production scales of the vehicles.

For the service brake application, the brake device is operated, and the wheel cylinder responsively operates and expands the brake shoes to thereby generate a braking force. During the service brake application, fine control of the braking force is required. Therefore, stability of the braking effect is essential. During the parking brake application, a mechanism interlocked with a parking lever, not the wheel cylinder, forcibly expands the brake shoes to generate the braking force. Therefore, reliable braking of the vehicle is essential, and hence, production of high braking effect is required. Thus, the braking characteristic required for exercising the service brake application is contradictory to that for exercising the parking brake application.

However, it is very difficult to realize coexistence of the contradictory braking characteristics in satisfactory levels in one drum brake device of the leading/trailing, two-leading or duo servo type.

To overcome the technical difficulty, a dual mode drum brake device is disclosed in JP-A-3-113133. In the brake device, during the service brake application, a pair of brakes shoes are operated in a leading/trailing mode to produce a required stability of the braking effect. During the parking brake application, those brake shoes are operated in the duo servo mode to produce high braking effect.

The parking brake mechanism, which is used for the dual mode drum brake device of JP-A-3-113133, uses a large lever member that ranges between the paired brake shoes. Therefore, large component parts must be used for constructing the parking brake mechanism.

Further, in assembling, the component parts must be mounted on both the brake shoes, and the assembling work of the parking brake mechanism is inefficient.

SUMMARY OF THE INVENTION

Accordingly, an object of the present invention is to provide a drum brake device improved in that during the service brake application, the brake device operates as a brake device of the leading/trailing type having a good ability of producing stable braking effect, and during the parking brake application, the brake device operates as a brake device of the duo servo type having a good ability of producing high braking effect, that the sized-reduced component parts may be used for constructing the brake device, and hence the resultant brake device is reduced in weight, and that the parking brake mechanism may be constructed into a unit and with this, the brake device is efficiently assembled.

To achieve the above object, there are provided improvements of a drum brake device including 1) a pair of brake shoes oppositely disposed in the inner space of a cylindrical brake drum, 2) a wheel cylinder of the dual-drive type disposed between one ends of the paired brake shoes, for pressing those ends of the brake shoes against a brake drum, 3) an anchor portion for supporting the other ends of the brake shoes and receiving an anchor counter force from the brake shoes, 4) an adjuster being disposed along the wheel cylinder and between the one ends of the brake shoes, the adjuster adjusting a distance between the brake shoes so that clearances between the one shoe and the brake drum and between the other shoe and the drum are not varied at the time of braking even when the wear of the brake shoes progresses, and 5) a parking brake mechanism for pressing the brake shoes against the brake drum when a parking lever is operated. The parking brake mechanism improved comprises: A) a first lever rotatably supported by the one brake shoe, when turned, the first lever thrusting the adjuster toward the other brake shoe to thereby expand the brake shoes; B) an equalizer rotatably supported at a position closer to the end of the brake shoe provided with the first lever, which is opposite to the end the brake shoe located closer to the adjuster, when turned, the equalizer thrusts a strut and then the other brake shoe whereby an anchor counter force is transmitted from the one brake shoe to the other brake shoe; and C) a second lever including an input portion for receiving a force from a parking lever, a lever contact portion for applying a turning force to the first lever, and an equalizer contact portion for applying a turning force to the equalizer, the second lever being rotatably supported on the brake shoe provided with the first lever, when turned by the force received at the input portion, the second lever turning the first lever and then the equalizer.

The drum brake device thus constructed operates in the following way. During the service brake application where the wheel cylinder operates in response to a braking operation, one shoe serves as a leading shoe. In this case, one end of the brake shoe receives the wheel cylinder, which is located at the input when viewed in the drum rotation direction. The output when viewed in the drum rotation direction is located near to the anchor portion. The other shoe serves as a trailing shoe. In this case, one end of the brake shoe serves as the input when viewed in the drum rotation direction is located near to the anchor portion. The other end of the brake shoe serves as the output when viewed in the drum rotation direction receives force from the wheel cylinder. Thus, the drum brake device operates a brake device of the leading/trailing type when the service brake is applied.

During the parking brake application, when the parking lever is operated and a second lever is turned, a lever contact portion of the second lever turns a first lever to thrust an adjuster. In turn, the first lever presses the end of the other brake shoe located near to the wheel cylinder with the aid of an adjuster to press the other brake shoe against a brake drum. Following the turn of the first lever, the second lever turns an equalizer to thrust a strut against the end of the other brake shoe located near to the anchor portion. As a result, an anchor counter force is input from the other brake shoe to the end of the one brake shoe located near to the anchor portion. Thus, the anchor counter force of the other brake shoe is applied as input force to the one brake shoe, thereby producing servo effect. Therefore, the drum brake device serves as a brake device of the duo servo type which is capable of producing high braking effect when the parking brake is applied.

A parking brake mechanism, which operates the paired shoes in a duo servo mode, is constructed such that its component parts, such as the first lever, the equalizer and the second lever, are all located on the secondary shoe. Therefore, these component parts may be small in size such that they are located within the area of the secondary shoe. This feature leads to size reduction of the parking brake mechanism.

Since all the component parts of the parking brake mechanism are assembled together on one brake shoe, the parking brake mechanism may be constructed in a unit form.

DETAILED DESCRIPTION OF THE PREFERRED EMBODIMENTS

The preferred embodiment of a drum brake device constructed according to the present invention will be described with reference to the accompanying drawings.

Figure 1:
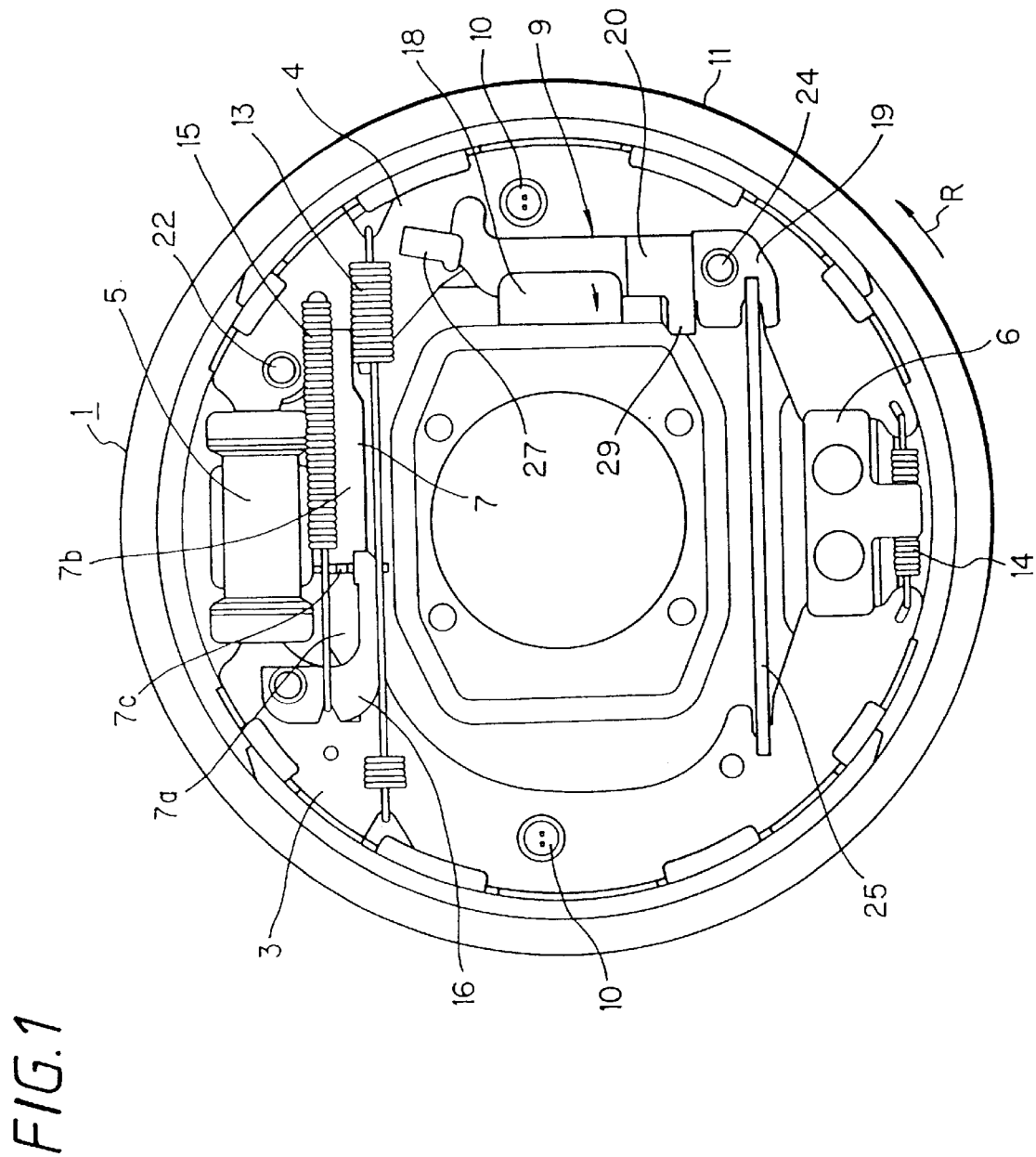
FIG. 1 is a front view showing a major portion of a drum brake device which is a preferred embodiment of the present invention.
Figure 2:
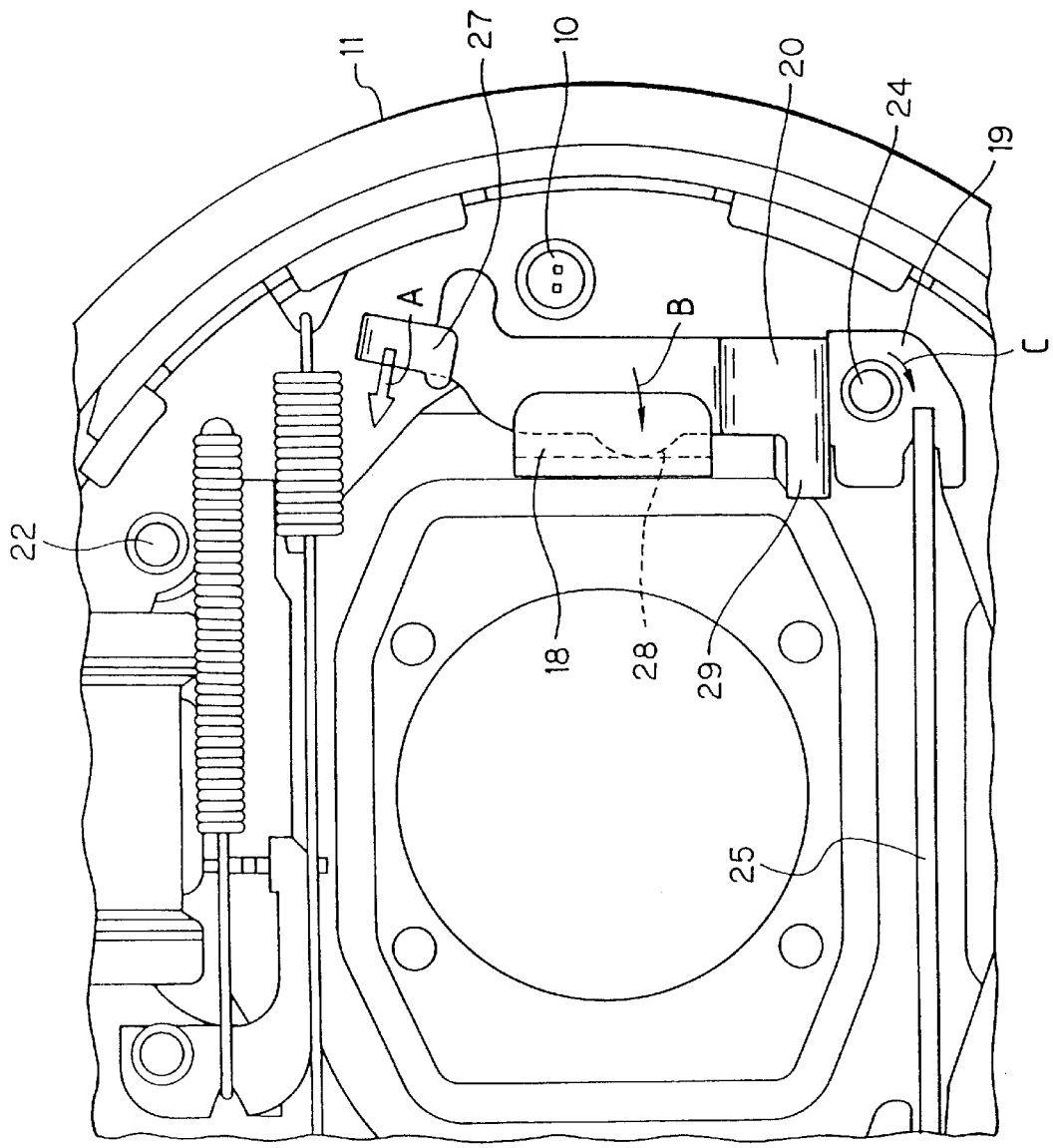
FIG. 2 is an enlarged view showing a key portion of the FIG. 1 brake device.
Figure 3:
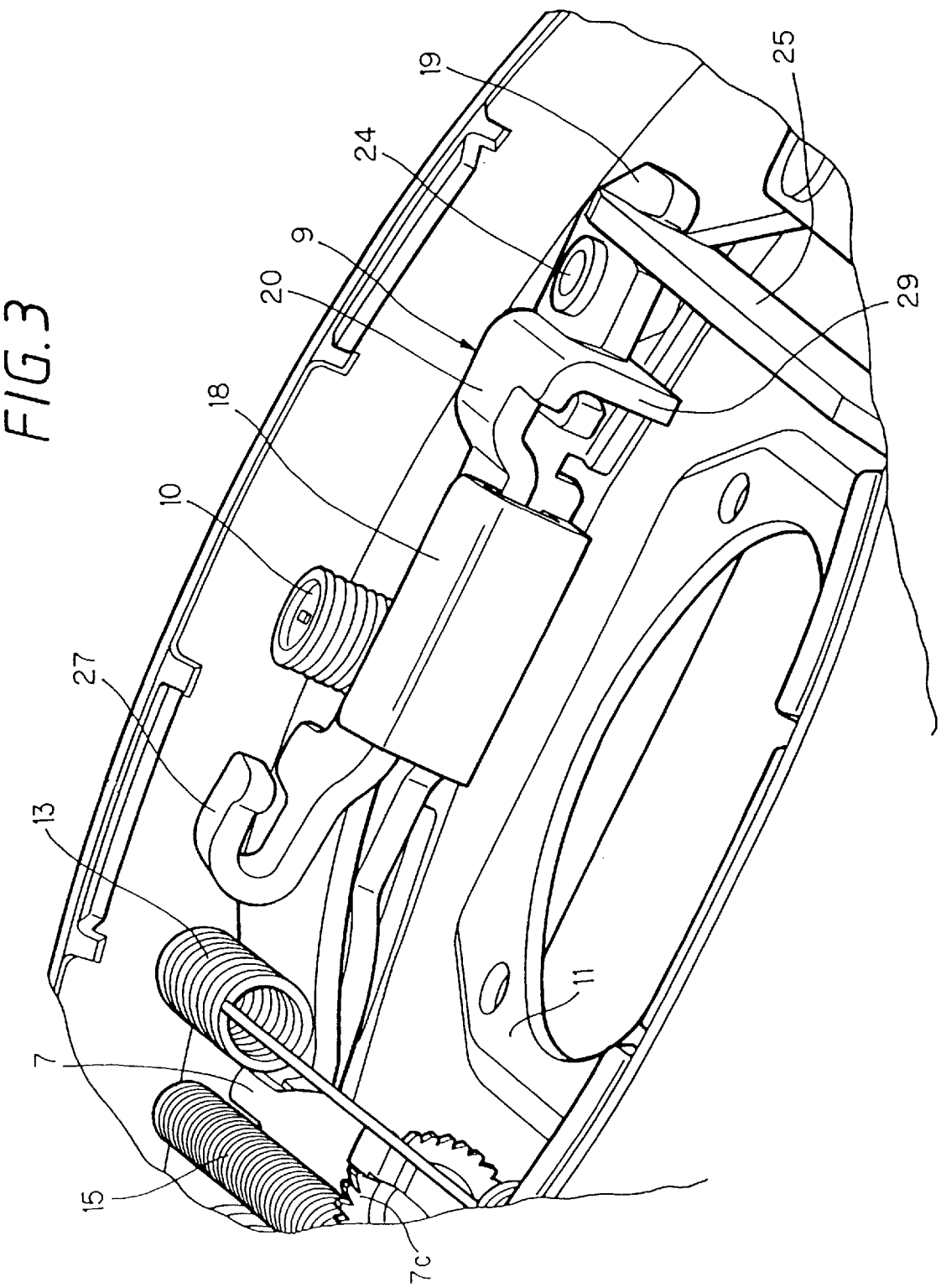
FIG. 3 is an enlarged, perspective view showing the portion of the brake device shown in FIG. 2.
Figure 4:
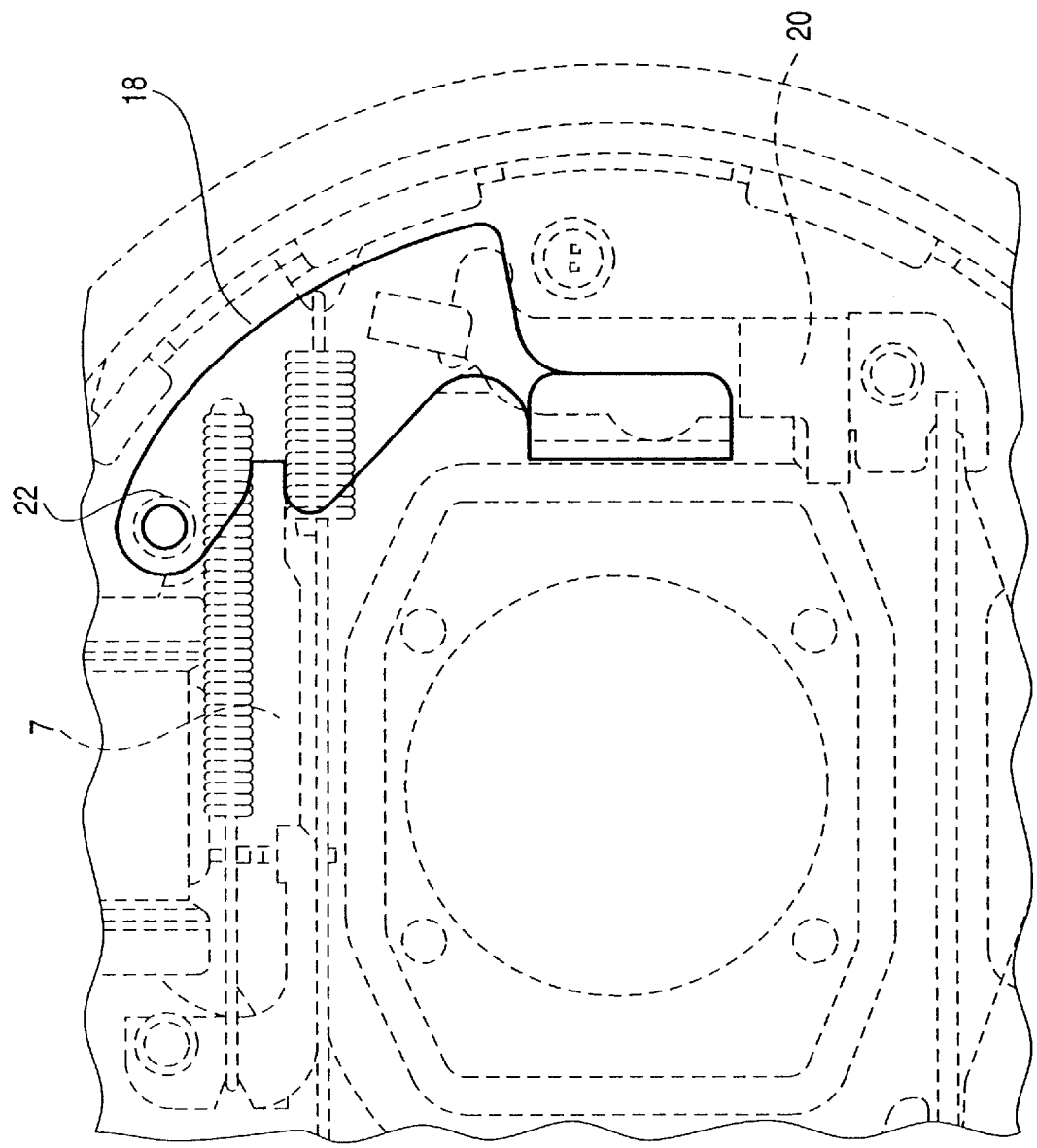

FIG. 1 is a front view showing a major portion of a drum brake device which is a preferred embodiment of the present invention. FIG. 2 is an enlarged view showing a key portion of the FIG. 1 brake device. FIG. 3 is an enlarged, perspective view showing the portion of the brake device shown in FIG. 2. FIG. 4 is an enlarged view showing a lever connected to a support pin for the brake device shown in FIG. 1.

As shown, a drum brake device 1 is made up of a pair of brake shoes, that is a primary shoe 3 and a secondary shoe 4, a wheel cylinder 5 of the dual-drive type, an anchor portion 6, an adjuster 7, and a parking brake mechanism 9. The primary and secondary shoes 3 and 4 are oppositely disposed in the inner space of a cylindrical brake drum (not shown). The wheel cylinder 5 is disposed between one ends of the paired brake shoes 3 and 4 and presses those ends of the brake shoes against the brake drum. The anchor portion 6 supports the other ends of those brake shoes 3 and 4 and receives an anchor counter force from those brake shoes. The adjuster 7 is disposed along the wheel cylinder 5 and between the one ends of the primary and secondary shoes 3 and 4. Functionally, it adjusts a distance between the brake shoes 3 and 4 so that clearances between the primary shoe 3 and the brake drum and between the secondary shoe 4 and the brake drum are not varied at the time of braking even when the wearing of the brake shoes 3 and 4 progresses. The parking brake mechanism 9 presses the brake shoes 3 and 4 against the brake drum when a driver operates a parking lever located near to the driver seat.

The primary and secondary shoes 3 and 4 are mounted on a backing plate 11 by shoe hold-down devices 10 such that those brake shoes are movable toward the inner circumferential surface of the brake drum.

The ends of the brake shoes 3 and 4 which are located closer to the wheel cylinder 5 are urged, by a shoe-to-shoe spring 13, in the directions in which those ends come nearer to each other (viz., move apart from the drum inner surface). The anchor portion 6 is fastened to the backing plate 11. The ends of the brake shoes 3 and 4, which are located closer to the anchor portion 6, are mutually coupled to each other by means of an anchor spring 14 and urged to be in contact with the anchor portion 6.

The adjuster 7 includes an adjuster socket 7a, an adjuster nut 7b and an adjuster gear 7c. One end of the adjuster socket 7a is brought into engagement with the primary shoe 3. One end part of the adjuster nut 7b is brought into contact with the secondary shoe 4. At each side of the adjuster gear 7c, a head rotatably connected with the adjuster socket 7a and a screw portion threadably connected with the adjuster nut 7b is provided (not shown). When the adjuster gear 7c rotates, it moves the adjuster socket 7a relative to the adjuster nut 7b. An adjuster spring 15 urges an adjuster lever 16 to bring the tip of the adjuster lever 16 into contact with the adjuster gear 7c.

The adjuster lever 16 rotates with an expanding motion of the primary shoe 3 that is caused at the time of braking. With progress of wear of the lining of the brake shoes, the adjuster lever 16 turns the adjuster gear 7c, so that a distance between the brake shoes 3 and 4 is automatically adjusted so as to maintain appropriate clearances each between the lining of each brake shoe and the drum.

In the present embodiment, the parking brake mechanism 9 is made up of a first lever 18, an equalizer 19 and a second lever 20, which are provided on the secondary shoe 4.

The first lever 18 is rotatably supported by a support pin 22, which is provided at one end of the secondary shoe 4 located closer to the adjuster 7. When turned clockwise (in FIG. 1) about the support pin 22, the first lever 18 thrusts the adjuster 7 toward the primary shoe 3, to thereby expand the pair of brake shoes 3 and 4.

The equalizer 19 is rotatably supported by a support pin 24 on the secondary shoe 4. The support pin 24 is provided at the other end of the secondary shoe 4 located opposite to the adjuster 7 (viz., closer to the anchor portion 6). When the equalizer 19 is turned about the support pin 24 in the clockwise direction (in FIG. 1), it thrusts the strut 25 and then the end of the primary shoe 3, so that an anchor counter force transmission is allowed between the opposed ends of the brake shoes. For example, when the brake device operates in a forward braking mode where the drum rotates in the direction of an arrow R in FIG. 1, an anchor counter force of the end of the primary shoe 3 is input as a servo force to the end of the primary shoe 3.

The second lever 20, as shown in FIG. 2, includes an input portion 27, a lever contact portion 28 and an equalizer contact portion 29. The input portion 27 is coupled to a parking lever located by the driver seat by means of a wire, for example, and receives a force from the parking lever. The lever contact portion 28 is in contact with the first lever 18 to apply a clockwise turning force about the support pin 22 (in FIG. 2) to the first lever. The equalizer contact portion 29 is in contact with the equalizer 19 to apply a clockwise turning force about the support pin 24 (in FIG. 2) to the same. The second lever 20 is supported above the secondary shoe 4 in swingable fashion with its engagement with the first lever 18 and the equalizer 19, and the wire (not shown) coupled to the input portion 27.

When the second lever 20 receives a force generated by the operated parking lever at its input portion 27, it is turned in the direction of an arrow A in FIG. 2 to turn the first lever 18 about the support pin 22 in the clockwise direction, and then the equalizer 19 about the support pin 24 in the same direction.

The thus constructed drum brake device 1 operates in the following manner. During the service brake application where the wheel cylinder 5 operates in response to a braking operation, for example, in the forward braking mode, the primary shoe 3 serves as a leading shoe. In this case, one end of the brake shoe receives the wheel cylinder 5, which is located at the input when viewed in the drum rotation direction. Then, the primary shoe 3 acts as a leading shoe with the anchor portion located at the output when viewed in the drum rotation direction.

On the other hand, the secondary shoe 4 serves as a trailing shoe during the service brake application. In this case, one end of the brake shoe acting as the input when viewed in the drum rotation direction acts as the anchor portion. The other end of the brake shoe acting as the output when viewed in the drum rotation direction receives power from the wheel cylinder 5. In the reverse braking mode, the secondary shoe 4 serves as the leading shoe, and the primary shoe 3 serves as the trailing shoe. Thus, in either of the forward and reverse braking modes, one brake shoes operates as the leading shoe, and the other brake shoe operates as the trailing shoe. In other words, the drum brake device operates as a brake device of the leading/trailing type which is capable of producing stable braking effect.

During the parking brake application, when the parking lever is operated to pull the second lever 20 in the direction A in FIG. 2, the lever contact portion 28 of the second lever 20 turns the first lever 18 in the direction of an arrow B in FIG. 2; the adjuster 7 is moved toward the primary shoe 3; and the primary shoe 3 is pressed against the brake drum.

After the first lever 18 is turned, the second lever 20 is turned about its lever contact portion 28, and in turn the equalizer contact portion 29 turns the equalizer 19 in the direction of an arrow C in FIG. 2. As a result, the equalizer 19 brings the adjuster spring 15 into contact with the end of the primary shoe 3 located closer to the anchor portion 6, so that an anchor counter force is input from the primary shoe 3 to the end of the secondary shoe 4 located at the anchor portion 6. In this state, the anchor counter force of the primary shoe 3 exerts input power on the end of the secondary shoe 4, thereby producing a servo effect. Thus, the drum brake device serves as a brake device of the duo servo type which is capable of producing high braking effect.

The parking brake mechanism 9, which operates the paired shoes 3 and 4 in a duo servo mode, is constructed such that its component parts, such as the first lever 18, the equalizer 19 and the second lever 20, are all located on the secondary shoe 4. Therefore, those component parts may be small in size such that they are located within the area of the secondary shoe 4. This feature leads to size reduction of the parking brake mechanism 9 and weight reduction of the drum brake device.

The feature that all the component parts of the parking brake mechanism 9 are assembled together on the secondary shoe 4 implies that the parking brake mechanism 9 may be constructed in a unit form. Where the parking brake mechanism 9 is mounted as a unit onto the brake shoe, the mounting work is simple and easy, and efficiently done.

It is readily understood that the parking brake mechanism 9 may be provided on the primary shoe 3 in place of the secondary shoe 4.

As seen from the foregoing description, a drum brake device constructed according to the present invention operates in the following way. During the service brake application where the wheel cylinder operates in response to a braking operation, one shoe serves as a leading shoe. In this case, one end of the brake shoe, which is located at the input when viewed in the drum rotation direction, receives a force from the wheel cylinder. Then, the output when viewed in the drum rotation direction acts as the anchor portion. On the other hand, the other shoe serves as a trailing shoe. In this case, one end of the brake shoe as the input when viewed in the drum rotation direction is located near to the anchor portion. The other end of the brake shoe as the output when viewed in the drum rotation direction receives power from the wheel cylinder. Thus, the drum brake device operates a brake device of the leading/trailing type when the service brake is applied.

During the parking brake application, when the parking lever is operated and a second lever is turned, a lever contact portion of the second lever turns a first lever to thrust an adjuster. In turn, the first lever presses the end of the other brake shoe located near the wheel cylinder with the aid of an adjuster to press the other brake shoe against a brake drum. Following the turn of the first lever, the second lever turns an equalizer to thrust a strut against the end of the other brake shoe located near to the anchor portion. As a result, an anchor counter force is input from the other brake shoe to the end of the one brake shoe located near to the anchor portion. Thus, the anchor counter force of the other brake shoe is applied as input force to the one brake shoe, thereby producing the servo effect. Therefore, the drum brake device serves as a brake device of the duo servo type which is capable of producing high braking effect when the parking brake is applied.

A parking brake mechanism, which operates the paired shoes in a duo servo mode, is constructed such that its component parts, such as the first lever, the equalizer and the second lever, are all located on the secondary shoe. Therefore, those component parts may be small in size such that those are located within the area of the secondary shoe. This feature leads to size reduction of the parking brake mechanism and weight reduction thereof.

The feature that all the component parts of the parking brake mechanism are assembled together on the secondary shoe implies that the parking brake mechanism may be constructed in a unit form. Where the parking brake mechanism is mounted as a unit onto the brake shoe, the mounting work is simple and easy, and efficiently done.

While only certain embodiments of the invention have been specifically described herein, it will be apparent that numerous modifications may be made thereto without departing from the spirit and scope of the invention.

The present invention is based on Japanese Patent Application No. Hei. 10-120922, which is incorporated herein by reference.

What is claimed is:

1. A drum brake device comprising:
   a first and second brake shoes oppositely disposed in an inner space of a cylindrical brake drum;
   a wheel cylinder of the dual-drive type disposed between one ends of said first and second brake shoes, wherein said wheel cylinder presses the ends of said first and second brake shoes against a brake drum;
   an anchor portion supporting the other ends of said first and second brake shoes and receiving an anchor counter force from said brake shoes;
   an adjuster disposed between the one ends of said first and second brake shoes, said adjuster adjusting a distance between said first and second brake shoes; and
   a parking brake mechanism for pressing said first and second brake shoes against the brake drum when a parking lever is operated,
   wherein said parking brake mechanism comprises:
      a first lever rotatably supported by one of said first and second brake shoes, said first lever thrusting said adjuster toward the other brake shoe and expanding said brake shoes when turned thereby;
      an equalizer rotatably supported at a position close to one end of one of said first and second brake shoes provided with said first lever, the end being located close to the other end of said brake shoe adjacent to said adjuster, wherein said equalizer transmits an anchor counter force from one of said first and second brake shoes to the other brake shoe when said first lever is operated; and
      a second lever including an input portion for receiving a force from said parking lever, a lever contact portion for applying a turning force to said first lever, and an equalizer contact portion for applying a turning force to said equalizer, said second lever rotatably supported on said brake shoe provided with said first lever, wherein said second lever turns said first lever and then said equalizer when said second lever is turned by the force received at said input portion.

2. A drum brake device which operates as a brake device of the leading/trailing type during service brake application and as a brake device of the duo servo type during parking brake application, the drum brake device comprising:
   a first and second brake shoes oppositely disposed in an inner space of a cylindrical brake drum;
   a wheel cylinder of the dual-drive type disposed between first ends of said first and second brake shoes, wherein said wheel cylinder presses the first ends of said first and second brake shoes against a brake drum;
   an anchor portion supporting other ends of said first and second brake shoes and receiving an anchor counter force from said brake shoes;
   an adjuster disposed between the first ends of said first and second brake shoes, said adjuster adjusting a distance between said first and second brake shoes; and
   a parking brake mechanism for pressing said first and second brake shoes against the brake drum when a parking lever is operated,
   wherein said parking brake mechanism comprises:
      a first lever rotatably supported by one of said first and second brake shoes, said first lever thrusting said adjuster toward the other brake shoe and expanding said brake shoes when turned thereby;
      an equalizer rotatably supported at a position close to one end of one of said first and second brake shoes provided with said first lever, the end being located close to another end of said brake shoe adjacent to said adjuster, wherein said equalizer transmits an anchor counter force from one of said first and second brake shoes to the other brake shoe when said first lever is operated; and
      a second lever including an input portion for receiving a force from said parking lever, a lever contact portion for applying a turning force to said first lever, and an equalizer contact portion for applying a turning force to said equalizer, said second lever rotatably supported on said brake shoe provided with said first lever, wherein said second lever turns said first lever and then said equalizer when said second lever is turned by the force received at said input portion.

* * * * *